(12) United States Patent
Xu et al.

(10) Patent No.: US 10,074,003 B2
(45) Date of Patent: Sep. 11, 2018

(54) DYNAMIC CONTROL FOR DATA CAPTURE

(71) Applicant: Intel Corporation, Santa Clara, CA (US)

(72) Inventors: Yan Xu, Santa Clara, CA (US); Maha El Choubassi, Santa Clara, CA (US); Joshua Ratcliff, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 303 days.

(21) Appl. No.: 14/329,711

(22) Filed: Jul. 11, 2014

(65) Prior Publication Data

US 2016/0012270 A1    Jan. 14, 2016

(51) Int. Cl.
G06K 9/00    (2006.01)
G06K 9/20    (2006.01)
(Continued)

(52) U.S. Cl.
CPC .......... *G06K 9/0002* (2013.01); *G06F 1/325* (2013.01); *G06F 1/3206* (2013.01);
(Continued)

(58) Field of Classification Search
CPC .... G06K 9/00013; G06K 9/0002; G06K 9/20; G06K 9/2054; G06K 9/2081; G06K 9/60;
(Continued)

(56) References Cited

U.S. PATENT DOCUMENTS 6,301,440 B1 * 10/2001 Bolle ............... H04N 5/232
348/229.1
8,339,469 B2 * 12/2012 Vau ................. H04N 5/232
382/309
(Continued)

FOREIGN PATENT DOCUMENTS

GB    2404511 A    2/2005
JP    2004-356970 A    12/2004
(Continued)

OTHER PUBLICATIONS

International Search Report and Written Opinion from related PCT/US2015/030930 dated Jul. 28, 2015.
(Continued)

*Primary Examiner* — Eric Rush
(74) *Attorney, Agent, or Firm* — Grossman, Tucker, Perreault & Pfleger, PLLC

(57) ABSTRACT

This application is directed to dynamic control for data capture. A device may comprise a capture logic module to receive at least one of biometric data from a biometric sensing module, context data from a context sensing module or content data from a content sensing module. The capture logic module may determine if a capture scenario exists based on at least one of the biometric data and context data. The determination may be weighted based on an operational mode. If a capture scenario is determined to exist, the capture logic module may then determine whether to capture data based on at least the content data. Captured data may be stored in a capture database in the device (e.g., along with enhanced metadata based on at least one of the biometric data, the context data or the content data). The device may also comprise a feedback database including feedback data.

25 Claims, 6 Drawing Sheets

(51) Int. Cl.
| | |
|---|---|
| *H04N 5/232* | (2006.01) |
| *G06F 1/32* | (2006.01) |
| *G06F 17/30* | (2006.01) |
| *G06F 21/32* | (2013.01) |
| *H04N 5/225* | (2006.01) |
| *H04N 101/00* | (2006.01) |

(52) U.S. Cl.
CPC .......... *G06F 17/3028* (2013.01); *G06F 21/32* (2013.01); *G06K 9/00885* (2013.01); *G06K 9/2054* (2013.01); *H04N 5/225* (2013.01); *H04N 5/23219* (2013.01); *H04N 5/23222* (2013.01); *H04N 5/23241* (2013.01); *G06F 2216/01* (2013.01); *G06F 2216/03* (2013.01); *H04N 2101/00* (2013.01)

(58) Field of Classification Search
CPC ........ G06K 9/605; G06K 9/78; G06T 1/0007; G03B 19/00; G03B 19/02; H04N 5/232; H04N 5/23219; H04N 5/23222; H04N 5/23241
USPC .......... 382/100, 115, 312, 321, 325
See application file for complete search history.

(56) References Cited

U.S. PATENT DOCUMENTS

| | | | | |
|---|---|---|---|---|
| 8,587,670 | B2* | 11/2013 | Wood | H04N 5/23245 348/207.99 |
| 8,745,250 | B2 | 6/2014 | Shah et al. | |
| 9,001,215 | B2* | 4/2015 | Jung | H04N 1/00068 348/207.1 |
| 9,210,319 | B2* | 12/2015 | Rav-Acha | H04N 5/23222 |
| 2004/0170397 | A1 | 9/2004 | Ono | |
| 2004/0208496 | A1* | 10/2004 | Pilu | H04N 5/232 396/263 |
| 2005/0012830 | A1 | 1/2005 | Maurizio | |
| 2005/0208496 | A1 | 9/2005 | Ohtani et al. | |
| 2008/0192129 | A1* | 8/2008 | Walker | G11B 27/034 348/231.2 |
| 2008/0298796 | A1* | 12/2008 | Kuberka | H04N 5/232 396/263 |
| 2012/0188382 | A1* | 7/2012 | Morrison | G06F 17/30247 348/207.1 |
| 2012/0242844 | A1 | 9/2012 | Walker et al. | |
| 2012/0200069 | A1 | 11/2012 | Sako et al. | |
| 2012/0300069 | A1 | 11/2012 | Sako et al. | |
| 2013/0057713 | A1* | 3/2013 | Khawand | H04N 5/232 348/208.1 |
| 2013/0142435 | A1* | 6/2013 | de Leon | H04N 1/00307 382/195 |
| 2013/0286244 | A1* | 10/2013 | Tirpak | H04N 5/23222 348/222.1 |
| 2014/0055846 | A1 | 2/2014 | Wheeler et al. | |
| 2016/0360160 | A1* | 12/2016 | Eizenberg | H04N 5/23245 |

FOREIGN PATENT DOCUMENTS

| | | |
|---|---|---|
| JP | 2007-336098 A | 12/2007 |
| JP | 2009-188899 A | 8/2009 |
| JP | 2010-016847 A | 1/2010 |
| JP | 2013-255168 A | 12/2013 |

OTHER PUBLICATIONS

Ljungblad, Sara, "Passive Photography from a Creative Perspective: 'If I would just shoot the same thing for seven days, it's like . . . What's the point?'", CHI 2009 ~ Art Creation, Apr. 7, 2009, pp. 829-838, Boston, MA, USA.

Butko, Nicholas, et al., "Visual Saliency Model for Robot Cameras," Robotics and Automation, 2008, 6 pages, IEEE International Conference.

Guo, Chenlei, et al., "Spatio-temporal Saliency Detection Using Phase Spectrum of Quaternion Fourier Transform," CVPR, 2008, 8 pages, IEEE.

Stefanoski, Nikolce, et al., "Automatic View Synthesis by Image-Domain-Warping," IEEE Transactions on Image Processing, Sep. 2013, pp. 3329-3341, vol. 22, No. 9, IEEE.

Hicks, Matt, "Making Photo Tagging Easier," Facebook, Jun. 30, 2011, 5 pages, http://www.facebook.com/notes/facebook/making-photo-tagging-easier/467145887130.

International Preliminary Report on Patentability and Written Opinion issued in PCT Application No. PCT/US2015/030930, dated Jan. 26, 2017, 6 pages.

Korean Office Action issued in Korean Application No. 10-2016-7034611, dated Jul. 13, 2017, with English machine translation, 11 pages.

Japanese Office Action issued in Japanese Application No. 2017-519208, dated Jan. 16, 2018, with English ranslation, 7 pages.

Communication issued in European Application No. 15819512.3, dated Feb. 23, 2018, 4 pages.

European Extended Search Report issued in European Application No. 15819512.3, dated Feb. 7, 2018, 87 pages.

Japan Office Action from related Japan Application 2017-519208, dated Jun. 27, 2018.

\* cited by examiner

DYNAMIC CONTROL FOR DATA CAPTURE

TECHNICAL FIELD

The present disclosure relates to data capture, and more particularly, to a system that may control data capture via intelligence that may evaluate user data, context data, content data, etc.

BACKGROUND

The frenetic pace of technological development in the area of mobile electronic devices has allowed for widespread integration of electronic communication into everyday interaction. For example, the simplest mobile communication device all the way to the most complex smart phone now comprises an image capture device as a basic feature. The ability to capture images, video, etc. on a mobile device has evolved from being a simple convenience to a data generating behemoth that has spawned web sites completely dedicated primarily to the communication of ideas via images or short video. Now devices are emerging that feature the ability for a user to record (e.g., capture) multimedia data (e.g., text, images, sound, video, etc.) in a configuration that is so small that the device may be integrated into objects that may be worn by the user. So, the ability to capture multimedia data available in a mobile communication device may then be accompanied by "wearable" devices that are ready at a moment's notice to immortalize an event.

However, the availability of a device to capture multimedia data does not preclude the possibility of some events not being captured. In existing devices the user must be "at the ready" to initiate data capture. For example, a user in a situation where data capture is desired must be able to devote attention to activating data capture functionality in a device, configuring how data will be captured (e.g., configuring the type of data that will be captured, the speed of capture, the resolution of the captured data, adjusting for environmental or device-related conditions that may affect capture, etc.) and then finally initiating the data capture process. Such constraints may be acceptable when both the user and the object of data capture is stationary, unchanging, posed, etc. However, the ability to capture data has made users desirous of capturing life as it happens, including unexpected events, events involving the user wherein the user is not able to interact with the capture device, etc. The only available option would then be to continuously capture data with the expectation that data of interest will also be captured. However, such behavior would quickly exhaust the resources of most mobile devices, yield copious amounts of data, etc.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
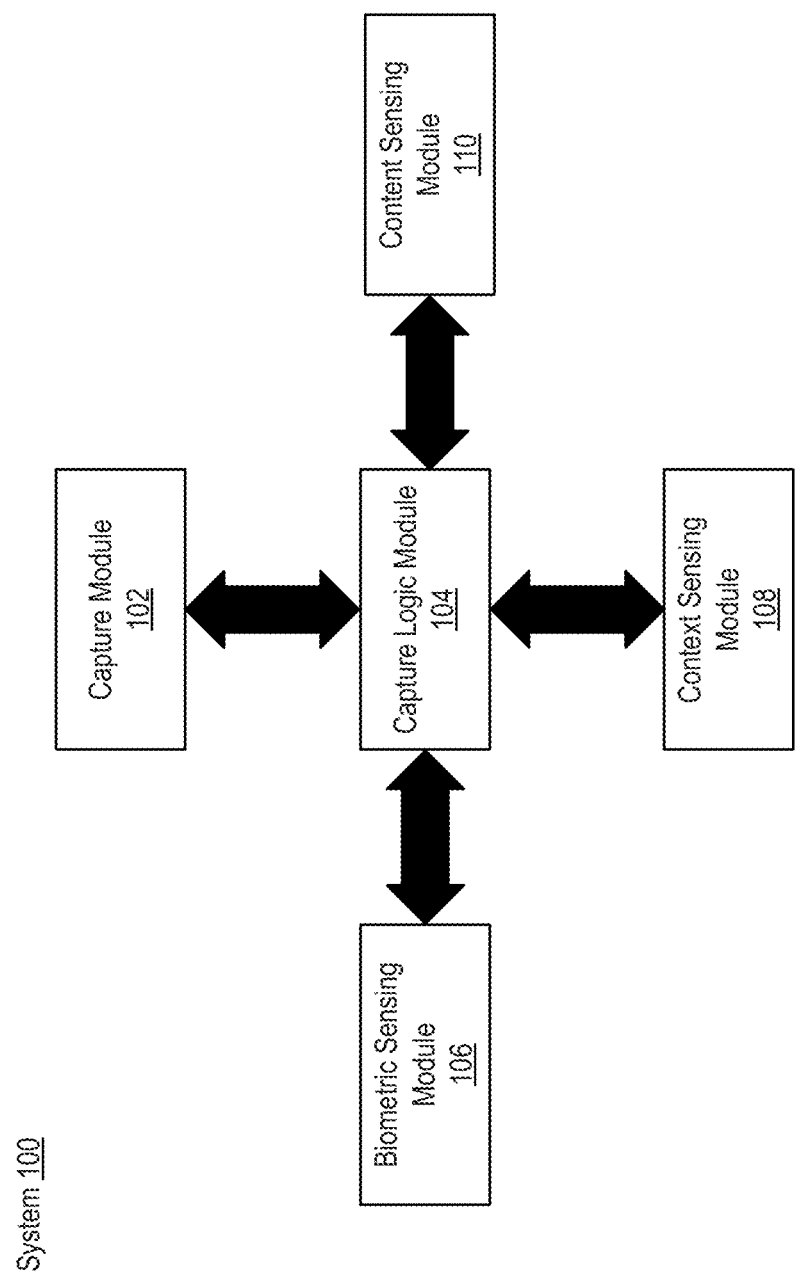
FIG. 1 illustrates an example system for dynamic control for data capture in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

This application is directed to dynamic control for data capture. In one embodiment, a device may comprise at least a capture logic module to receive at least one of biometric data from a biometric sensing module, context data from a context sensing module or content data from a content sensing module. At least part of the biometric, context and content modules may be external to the device. The capture logic module may initially determine if a capture scenario exists (e.g., a scenario in which it may be desirable to capture data) based on at least one of the biometric data and context data. This determination may be weighted based on an operational mode determined by the capture logic module. If a capture scenario is determined to exist, the capture logic module may then determine whether to initiate data capture based on at least the content data. Captured data may be stored in an image capture database. In one embodiment, captured data may be stored along with enhanced metadata based on at least one of the biometric data, the context data or the content data. The device may further comprise a feedback database including feedback data for generating criteria used in the above capture-related determinations.

In one embodiment a device to control data capture may comprise, for example, a capture database and a capture logic module. The capture database may be to store captured data. The capture logic module may be to receive biometric data from a biometric sensing module, to receive context data from a context sensing module and to determine whether a capture scenario exists based on at least one of the biometric data or context data. The capture logic module may then be to receive content data from a content sensing module based on at least the determination of whether a capture scenario exists, to determine whether to capture data based on at least the content data, to cause a capture module to capture data based on at least the determination of whether to capture data and to cause the captured data to be stored in the capture database.

In one embodiment, the device may further comprise a communication module to allow the capture logic module to interact with at least part of the biometric sensing module external to the device. The communication module may further be to allow the capture logic module to interact with at least part of the context sensing module external to the device and/or to allow the capture logic module to interact with at least part of the capture module external to the device. The biometric data may comprise, for example, data describing at least one of movement of a user of the device, focus of the user of the device or excitement level of the user of the device as determined based on data received by the biometric sensing module. The context data may comprise, for example, data describing at least one of time, date, location, scene, proximate objects or proximate people as determined based on data received by the context sensing module. The content data may comprise, for example, data describing at least one of capture quality, aesthetic quality or object recognition as determined based on data received by the content sensing module.

In the same or another embodiment, the device may further comprise a feedback database situated at least partially in the device to provide user feedback data to generate criteria for use in controlling at least one of the biometric sensing module, context sensing module, content sensing module or capture module. The capture logic module may further be to configure the capture module prior to causing the capture module to capture data. The capture logic module may further be to cause enhanced metadata to be stored in the capture database in association with the capture data, the enhanced metadata being based on at least one of the biometric data, the context data or content data. In addition, the capture logic module may further be to determine a mode of operation and set weighting between at least the biometric data and context data based on the mode of operation prior to determining whether a capture scenario exists based on at least one of the biometric data or context data. An example method for dynamic control of data capture consistent with the present disclosure may comprise receiving biometric data, receiving context data, determining whether a capture scenario exists based on at least one of the biometric data or context data, receiving content data based on at least the determination of whether a capture scenario exists, determining whether to capture data based on at least the content data, causing data to be captured based on at least the determination of whether to capture data and causing the captured data to be stored in a capture database.

FIG. 1 illustrates an example system for dynamic control for data capture in accordance with at least one embodiment of the present disclosure. Initially, the terminology "data capture," as referenced herein, may comprise the recording of any type of data by an electronic device. A typical situation involving data capture is taking a digital picture utilizing a camera in a mobile communication device, tablet computing device, etc. However, data capture may also comprise recording audio, video, environmental data (e.g., time, date, temperature, location, etc.), etc.

In general, system 100 may be configured to determine situations in which data capture may be desirable based on, for example, comparing sensed data to criteria corresponding to user interest, and to then trigger data capture without the requirement of direct user interaction. Thus, data capture may occur autonomously in a manner that seeks to replicate how the user would act if manually orchestrating the data capture. To perform the above functionality, system 100 may comprise, for example, capture module 102, capture logic module 104, biometric sensing module 106, context sensing module 108 and content sensing module 110 (collectively, "modules 102-110). Modules 102-110 may reside in the same device, or some or all of modules 102-110 may be distributed in a variety of implementations. Example implementations for system 100 will be described below and in conjunction with FIG. 2 with respect to an example device configuration.

Capture module 102 may be, consistent with the present disclosure, the module to which control is being applied by capture logic module 104. At least one example of capture module 102 may be a camera and/or microphone in a mobile communication device or tablet computing device that may also include capture logic module 104. Alternatively, capture module 102 may be separate from modules 104-110, such as in the case of a wearable camera and/or microphone device. For example, capture module 102 may be integrated into eyewear, headwear, a wearable harness, etc. Capture logic module 104 may comprise processing resources for processing data received from biometric sensing module 106, context sensing module 108 and/or content sensing module 110, and for determining if/when to trigger data capture based on the processed data.

In an example of operation, biometric sensing module 106 may provide biometric data to capture logic module 104. Biometric data may include data read from sensors attached to, or at least in near proximity to, a user of system 100 that may be used to determine characteristics of the user. Examples of characteristics may include mood, focus, excitement level, etc. Context sensing module 108 may provide context data to capture logic module 104. Context data may be determined from resources internal to, or external to, the device in which capture logic module 104 resides. Examples of context data may include time, date, location, special events, nearby objects, nearby people, etc. Content sensing module 110 may provide content data to capture logic module 104. Content data may be determined at least in part based on potential data to capture as sensed by capture module 102. Examples of content data may include capture quality, aesthetic quality, object recognition, etc. Initially, capture logic module may consider at least the biometric data and context data to determine if a capture scenario exists. A capture scenario may be a situation that, based on user configuration, preferences, feedback, etc. is desirable in which to capture data. Example capture scenarios may include, but are not limited to, sporting events, education and/or informational events, special events (e.g., family celebrations, birthday parties, weddings, etc.), any scenario that may involve an increased excitement level (e.g., participating in an extreme sport, witnessing an unexpected event such as an auto accident, criminal act, etc.), etc. If is determined that a capture scenario exists, then capture logic module 102 may begin to monitor the content data to determine when to activate data capture. For example, in a scenario where capture module 102 includes a camera, following a determination that a capture scenario exists, the camera may be activated and images seen by the camera may be evaluated for capture. For example, camera images may be evaluated based on image content, quality, aesthetics, etc. Capture logic module 104 may also take into account factors unrelated to the data to be captured such as, for example, processing load, communication traffic, resource availability (battery level, data storage space, etc.), privacy issues, etc. when determining whether or not to capture data.

Data that is captured may be stored in a capture database. The captured data may be stored along with enhanced metadata. Enhanced metadata, as referenced herein, is "data about data" that may correspond to captured data. In the realm of image capture, Exchangeable Image File Format (EXIF) data may currently be stored with digital photographs, but is limited to time, date, geolocation and camera settings. Consistent with the present disclosure, the EXIF-type metadata may be supplemented with metadata based on at least one of the biometric data, context data and content data. Enhanced metadata may have a variety of uses. For example, enhanced metadata may be used to group/filter captured data, the selection or deletion of which by a user may be saved as feedback in a feedback database. For example, enhanced metadata from saved data (e.g., selected images) may be used to formulate and/or refine the criteria used to determine capture scenarios and/or to trigger image capture. Example criteria may include the combination of biometric data that indicates when the user is happy, angry, excited, focused, etc., what times, days, locations, people, etc. make up a desirable context for data capture, what quality, content, aesthetics are typically need to retain captured data, etc. Moreover, the determination of capture scenarios and/or the triggering of image capture may also be based on an operational mode that is set for system 100. For example, a user may manually set an operational mode such as sport, social, nature, etc. The operational mode may comprise weighting that may affect how capture logic module 104 evaluates the biometric data, context data and content data. For example, in sport mode capture logic module 104 may focus more on biometric data, in social mode context data may be most important and in nature mode content data may be weighted most heavily.

Figure 2:
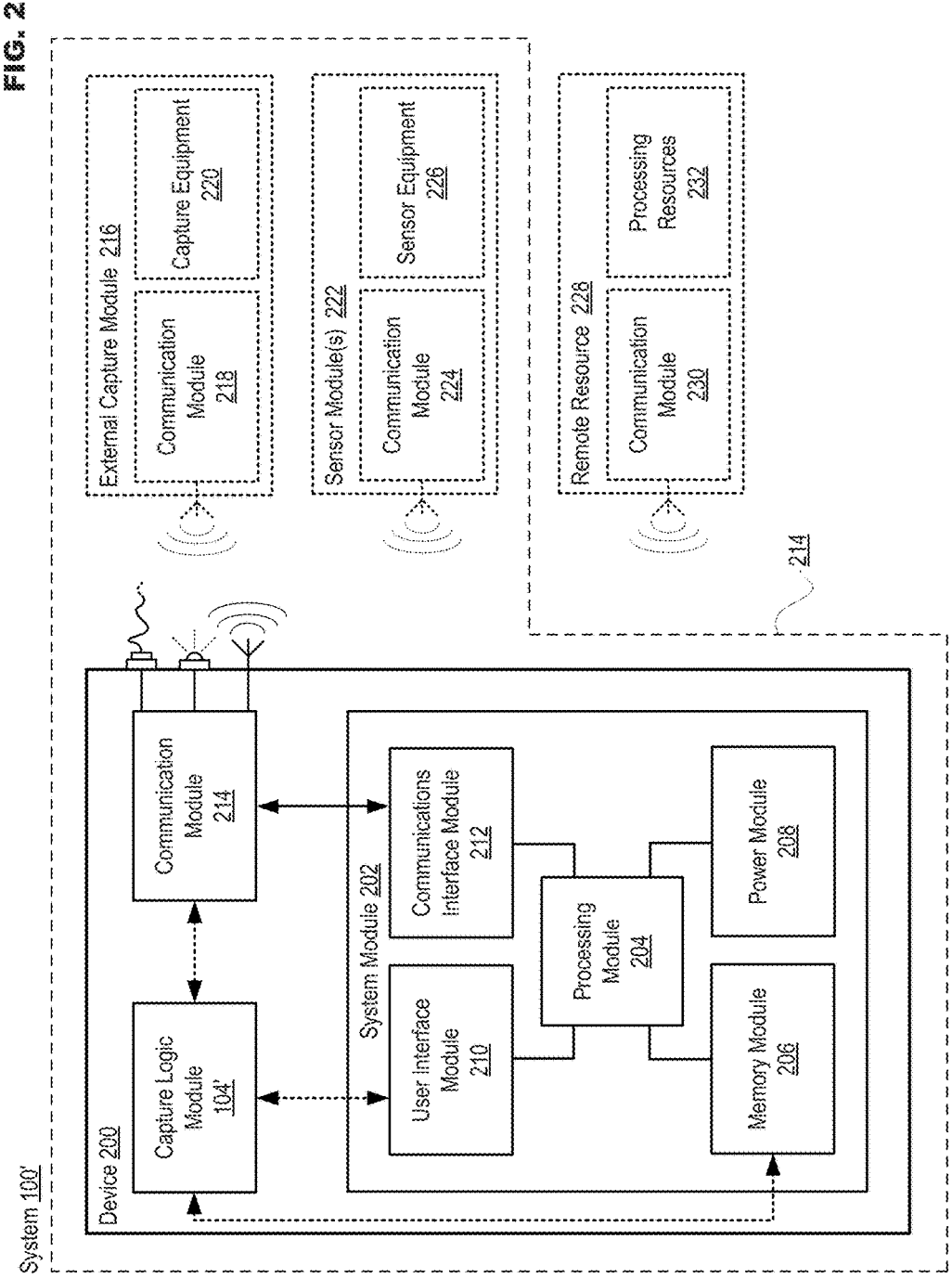
FIG. 2 illustrates example configurations for a device, along with system components that may be external to the device, usable in accordance with at least one embodiment of the present disclosure.

FIG. 2 illustrates example configurations for a device, along with system components that may be external to the device, usable in accordance with at least one embodiment of the present disclosure. System 100' may comprise at least device 200. In one embodiment, device 200 may incorporate all of the resources needed by system 100' to operate. Alternatively, device 200 may interact with external capture module 216, at least one external sensor module 222 and/or remote resource 228. While various embodiments of the present disclosure may be readily applicable to mobile scenarios in which device 200 may be a mobile communication device such as a cellular handset or a smart phone based on the Android® OS from the Google Corporation, iOS® from the Apple Corporation, Windows® OS from the Microsoft Corporation, Mac OS from the Apple Corporation, Tizen OS from the Linux Foundation, Firefox OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Surface® from the Microsoft Corporation, Galaxy Tab® from the Samsung Corporation, Kindle Fire® from the Amazon Corporation, etc., an Ultrabook® including a low-power chipset manufactured by the Intel Corporation, a netbook, a notebook, a laptop, a palmtop, etc., it is also foreseeable that in some instances device 200 may be a typically stationary computing device such as a desktop computer, a server, a smart television, a small form factor computing solution (e.g., for space-limited applications, TV set-top boxes, etc.) like the Next Unit of Computing (NUC) platform from the Intel Corporation, etc. Regardless of the actual implementation, system 100' is intended only as an example of equipment that may be usable in various embodiments consistent with the present disclosure, and is not meant to limit the embodiments to a particular manner of implementation.

Device 200 may comprise, for example, system module 202 configured to manage device operations. System module 202 may include, for example, processing module 204, memory module 206, power module 208, user interface module 210 and communication interface module 212. Device 200 may also include communication module 212 and capture logic module 104'. While communication module 212 and capture logic module 104' have been shown as separate from system module 200, the example implementation illustrated in FIG. 2 has been provided herein merely for the sake of explanation. Some or all of the functionality of communication module 212 and/or capture logic module 104' may be incorporated into system module 200.

In device 200, processing module 204 may comprise one or more processors situated in separate components, or alternatively, one or more processing cores embodied in a single component (e.g., in a System-on-a-Chip (SoC) configuration) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Core i-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 204 may interact with other system components that may be operating at different speeds, on different buses, etc. in device 200. Some or all of the functionality commonly associated with the support circuitry may also be included in the same physical package as the processor (e.g., such as in the Sandy Bridge family of processors available from the Intel Corporation).

Processing module 204 may be configured to execute various instructions in device 200. Instructions may include program code configured to cause processing module 204 to perform activities related to reading data, writing data, processing data, formulating data, converting data, transforming data, etc. Information (e.g., instructions, data, etc.) may be stored in memory module 206. Memory module 206 may comprise random access memory (RAM) or read-only memory (ROM) in a fixed or removable format. RAM may include volatile memory configured to hold information during the operation of device 200 such as, for example, static RAM (SRAM) or Dynamic RAM (DRAM). ROM may include non-volatile (NV) memory modules configured based on BIOS, UEFI, etc. to provide instructions when device 200 is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Power module 208 may include internal power sources (e.g., a battery, fuel cell, etc.) and/or external power sources (e.g., electromechanical or solar generator, power grid, fuel cell, etc.), and related circuitry configured to supply device 200 with the power needed to operate. User interface module 210 may include hardware and/or software to allow users to interact with device 200 such as, for example, various input mechanisms (e.g., microphones, switches, buttons, knobs, keyboards, speakers, touch-sensitive surfaces, one or more sensors configured to capture images and/or sense proximity, distance, motion, gestures, orientation, etc.) and various output mechanisms (e.g., speakers, displays, lighted/flashing indicators, electromechanical components for vibration, motion, etc.). The hardware in user interface module 210 may be incorporated within device 200 and/or may be coupled to device 200 via a wired or wireless communication medium.

Communication interface module 212 may be configured to manage packet routing and other control functions for communication module 214, which may include resources configured to support wired and/or wireless communications. In some instances, device 200 may comprise more than one communication module 214 (e.g., including separate physical interface modules for wired protocols and/or wireless radios) all managed by a centralized communication interface module 212. Wired communications may include serial and parallel wired mediums such as, for example, Ethernet, Universal Serial Bus (USB), Firewire, Digital Video Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), etc.), short-range wireless mediums (e.g., Bluetooth, WLAN, Wi-Fi, etc.), long range wireless mediums (e.g., cellular wide-area radio communication technology, satellite-based communications, etc.) or electronic communications via sound waves. In one embodiment, communication interface module 212 may be configured to prevent wireless communications that are active in communication module 214 from interfering with each other. In performing this function, communication interface module 212 may schedule activities for communication module 214 based on, for example, the relative priority of messages awaiting transmission. While the embodiment disclosed in FIG. 2 illustrates communication interface module 212 being separate from communication module 214, it may also be possible for some or all of the functionality of communication interface module 212 and communication module 214 to be incorporated into the same module.

Capture logic module 104' may interact with at least memory module 206, user interface module 210 and/or communication module 214 depending on the particular implementation of system 100'. For example, if all resources required by system 100' are available in device 200, then capture logic module 104' may interact with user memory module 206 to obtain biometric data, context data and/or content data, and may interact with user interface module 210 to cause capture equipment (e.g., camera, microphone, etc.) associated with user interface module 210 to initiate data capture. Alternatively, a distributed implementation is also possible wherein some or all of the resources required by capture logic module 104' are located outside of device 200. Example external devices in system 100' that may be in the possession of a user (e.g., that may be worn or carried by the user) are identified by being enclosed within dashed line 214. External capture module 216 may comprise, for example, at least communication module 218 and capture equipment 220. In one embodiment, external capture module 216 may be a wearable device such as a camera and/or microphone enabled for wireless interaction via communication module 216. In this instance, capture logic module 104' may interact with communication module 214 to receive data from, and transmit data to, external capture module 216. The communication between capture logic module 104' and capture equipment 220 may comprise, for example, instructions to activate, configure and/or trigger data capture in data capture equipment 220, confirmation of the instructions, error messages, etc. Likewise, some or all of biometric sensing module 106, context sensing module 108 and/or content sensing module 110 may be situated outside of device 200. For example, one or more sensor module(s) 222 may be worn by the user and may comprise at least communication module 224 and sensor equipment 226. Capture logic module 104' may employ communication module 214 when accessing sensor modules 222 to obtain data, for configuring, etc. Sensor equipment 226 may be to sense at least one of biometric data, context data or content data. More specific examples of data that may be sensed by sensor equipment 226 will be discussed in regard to FIG. 3. Remote resources 228 may comprise, for example, at least communication module 230 and processing resources 232. An example of remote resource 228 may comprise at least one server accessible via a network connection (e.g., configured in a cloud computing architecture). In an example of operation, remote resource 228 may be configured to provide externally stored data about a user to capture logic module 104' (e.g., and/or other components of modules 106-110 in device 200) via communication module 214. More specific examples of data that may be provided will be discussed in regard to FIG. 3.

Figure 3:
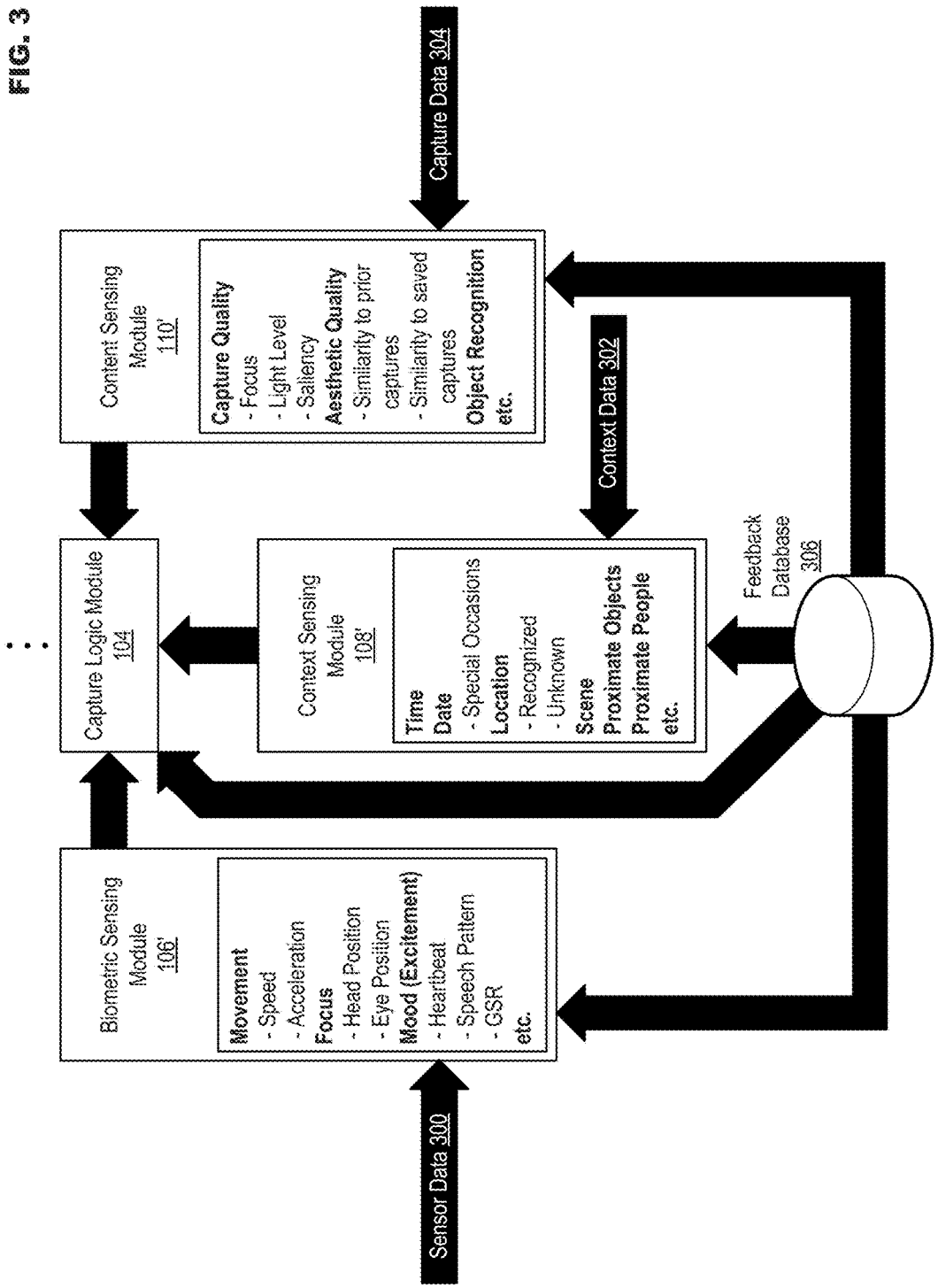
FIG. 3 illustrates an example of data flow contributing to the decision logic for triggering data capture in accordance with at least one embodiment of the present disclosure.

FIG. 3 illustrates an example of data flow contributing to the decision logic for triggering data capture in accordance with at least one embodiment of the present disclosure. Initially, it is important to comprehend that capture logic module 104 may comprise at least a learning engine and/or other similar logical architecture for determining when a capture scenario exists and when to initiate data capture. This determination may be made based on comparing data provided by biometric sensing module 106', context sensing module 108' and content sensing module 110' to criteria established based on user preference. The data processing undertaken by capture logic module 104, as compared to modules 106' to 110', may vary depending on configuration. For example, all raw data processing may be performed within capture logic module 104, relegating modules 106' to 110' to acting as simple data gatherers. In a distributed system modules 106' to 110' may perform at least some raw data processing, the final results of which may be provided to capture logic module 104 as logical determination (e.g., the user is happy, the user is at home, the user is focused, etc.). Combinations falling between the two extremes are also contemplated. It is important to note that capture scenario determination and/or data capture may also depend on operational mode (e.g., if system 100 includes functionality wherein an operational mode may be set). Without operational mode functionality the data providing by modules 106' to 110' may be considered equally or based on a fixed weighting. The introduction of a variable operational mode may allow a user to manually set (e.g., via user interface module 210) an operational mode that may alter the weighting based on the capture scenario (e.g., sports, social gathering, etc.), the data to be captured (e.g., moving subjects, stationary subjects, close-proximity images, wide-area images, natural settings, urban settings, etc.), etc. Weighting may be based on, for example, the criteria deemed to be most important or most relevant to the quality of the data being captured. Examples may include weighting biometric data more heavily in a sports mode to capture data during moments of excitement, weighting context data more heavily in a social mode so as to be able to capture appropriate data in what might be a frenetic setting, weighting content data most important in a nature mode to ensure that the natural beauty of the setting is captured, etc.

Biometric sensing module 106' may be configured to receive sensor data 300 related to the current disposition of a user of device 200. For example, sensor data 300 may be provided by sensor module(s) 222. Example categories of data that may be collected and/or processed by biometric sensing module 106' include user movement, focus, mood, etc. Movement may show that the user is currently engaged in activity, is stationary and focused on observing an event, etc. These conditions may indicate the need to activate data capture. Movement may be measured in terms of speed and/or acceleration based on, for example, GPS coordinates, acceleration sensors, etc. Focus may also be an indicator to begin data capture, and may be determined through head position, eye focus, etc. Focus may be measured via, for example, an image captured by at least one wearable image capture device (e.g., external capture module 216) indicating where a user's eyes are focused, when an image visible to the image capture device has not changed for a period of time, etc. The mood of the user may be determined using various factors including excitement level. For example, if a user is excited then it may be an opportune time to initiate data capture. Excitement level may be determined through, for example, at least one sensor module 222 being configured to sense a user's heartbeat, speech patterns, galvanic skin response (GSR), etc.

Figure 4:
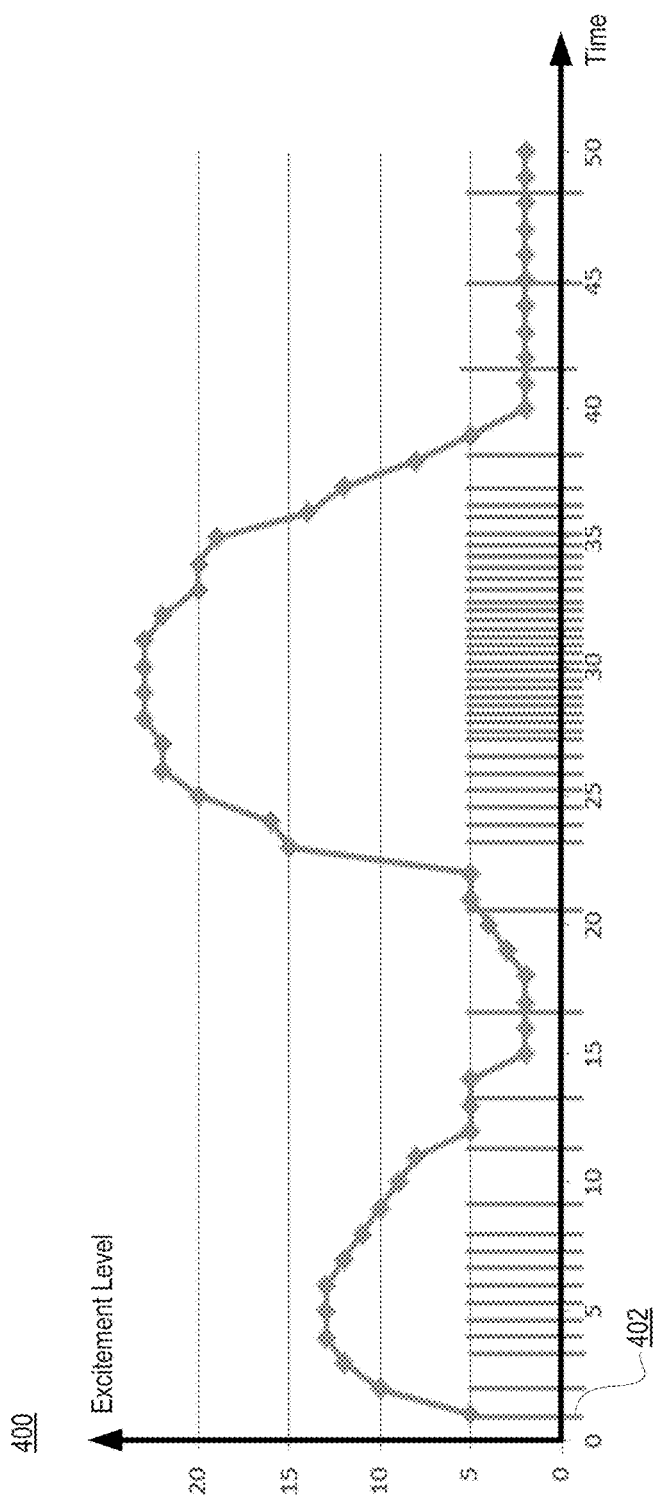
FIG. 4 illustrates an example chart describing data used in excitement level determination in accordance with at least one embodiment of the present disclosure.

For example, FIG. 4 discloses how excitement level may be determined on GSR. It has been shown that electro-dermal activity (EDA) values may correlate with high arousal, and that a high level of arousal can be indicative of a high level of challenge, frustration and/or excitement. At least one reliable way to measure EDA is through GSR sensors. For example, the activation of data capture and/or the rate of data capture may be controlled based on determined excitement level. Chart 4 demonstrates this relationship in that excitement level (e.g., as measured by GSR sensors embodied in sensor module(s) 222) is plotted over time. Instances of data capture 402 in Chart 400 are shown to increase (e.g. become more dense) in correspondence with monitored increases in excitement level. An increase in excitement may not only occur due to an enjoyable event, but may also be associated with bad or traumatic events such as an injury, an automobile accident, witnessing a criminal act, etc. It may be beneficial to increase data capture in such an instance as the captured data may be supplied to, a medical provider, an insurance provider, law enforcement, etc. When excitement lessens, the density of data capture may likewise decrease.

Returning to FIG. 3, context sensing module 108' may collect data in order to put the current situation surrounding the user of device 200 into a context that may then be evaluated to determine if the context is familiar, desirable, etc. Context data that may be provided to capture logic module 104, as previously discussed, may comprise raw collected data, or alternatively, a determination of a particular context (e.g., home, work, school, birthday party, etc.). Examples of raw context data 302 that may be collected by context sensing module 108' may include time, date, location, scene, proximate objects, proximate people, etc. Time, date and location data may be readily available through the OS of device 200. Scene, as well as proximate objects/people, may be obtained from a variety of sources. For example, context sensing module 108' and/or capture logic module 104 may be capable of accessing applications running on device 200 such as scheduling applications, social media applications, messaging applications, etc. in order to determine the scene and proximate people/objects of interest. Scheduling and social media may identify important events that may be correlated to the user's current location on a particular day, at a particular time, etc. Moreover, data may also be directly obtained from remote resource 228 (e.g., without going through an application that is resident on device 200) to determine planned events, the location of acquaintances/friends/family so as to determine the people of interest that may be proximate to the user, the location of places of interest such as monuments, parks, places of historical interest, etc. The above data may be evaluated alone or in combination to determine whether the current user context constitutes a scenario in which data capture may be desired.

Given that, based on at least one of the biometric data or context data it is determined that a capture scenario exists, then content sensing module 110' may initiate collection of capture data 304. For example, capture logic module 104 may activate capture module 104' and a live feed of data may be evaluated by content sensing module 110' and/or capture logic module 104 to determine when to capture data. The determination to trigger data capture may be based on the same type of data the user might employ for knowing when to manually trigger data capture including, for example, capture quality, aesthetic quality, object recognition, etc. Capture quality may constitute focus, light level, saliency, etc. For example, a saliency map may be generated for photo/video and may be used to decide whether or not desirable content exists in the camera view. Data may be captured when the saliency level is high. For example, one simple measure of texture saliency of an image I may be obtained by computing the empirical variance for each block in the image. For a certain block B in the image, we first estimate the mean $$\hat{\mu} = \frac{1}{|B|} \sum_{pixels\ in\ B} I_i \qquad (1)$$

Wherein |B| is the number of pixels in the block and $\hat{\mu}$ is the sample mean. The unbiased sample variance may then be as follows:

$$\hat{\sigma}^2 = \frac{1}{|B|-1} \sum_{pixels\ in\ b} (I_{i-\hat{\mu}})^2 \qquad (2)$$

The estimated variance within each block may be a good indicator as to the amount of texture in the image. For example, a plain block with only one color will have zero variance, and thus, zero texture saliency. Highly textured block will have lots of changes in color and hence a high estimated variance (e.g., high saliency). The actual algorithm utilized to determine whether to trigger data capture may be selected based on, for example, the amount of processing power in device 200. For example, texture saliency can be utilized to exclude random texture-less photos often people take by mistake, such as photos of a plain surface like the wall. Additionally, depth saliency may be extracted for capture devices in wearable/mobile platforms. Depth can be used to assign higher saliency to close objects based on the intuitive assumption that having an object significantly closer than other objects in the scene implies that the user is particularly interested in this object. In one embodiment, aesthetic quality may be determined by evaluating an image against existing photography rules, such as composition, lighting, color compatibility, etc. The result of the analysis may assign a score to the photo. Capture logic module 104 may then utilize the score to decide whether to take the photo, discard it, or simply record the score for later use. Moreover, it is also be possible for various objects to be recognized in potential data to capture. For example, the recognition that a potential image to capture contains people may bias towards capturing the data for a user that has demonstrated a liking for photos that contain people.

Based on the contributions of modules 106'-110', the behaviors of system 100 may be adjusted based on an evaluation of all factors. Through machine learning and data mining tools, such as neural networks, a model may be trained with layers of factors. The training of the models may be based on feedback data provided by feedback database 306. In one embodiment, feedback database 306 may retain user-generated feedback information in regard to previously captured data. User-generated feedback information may include subjective and/or intentional responses to the captured data generated by the user and/or other parties to whom the captured data may be presented such as, for example, the user's family, friends (e.g., social networks), professional colleagues, participants in the same or similar activities (e.g., sports, hobbies, etc.) as the user, etc. Examples of feedback information may include user interaction with captured data (e.g., deleting, saving, emailing, refocusing, magnifying, cropping, etc.), online interaction such as Flikr ratings, Facebook "Likes," Twitter "Tweets" and/or "Retweets," etc. Feedback information may be available from, for example, applications executing in device 200, directly from remote resource 228, etc. In the same or a different embodiment, feedback database 306 may also include enhanced metadata about captured data that the user saved vs. captured data that was eventually deleted. Example enhanced metadata may include, for example, the mood, focus, activity, etc. of the user when the data was captured, the time, date, location, event correlation, etc. when the data was captured, the content of the data, etc. Data derived from the feedback information and/or enhanced metadata may be fed to models to form criteria for future capture scenario determination and/or capture triggering. In one embodiment, feedback database 306 may include a history of the usage data for the user, and may provide personalized baseline and patterns for analyzing raw sensor data to generate higher level understandings on the context, user and the potential data to be captured. In addition to training the models, feedback data may also be utilized (e.g., by capture logic module 104) to configure the operation of capture logic module 104 and/or modules 106'-110' in terms of, for example, when to trigger data capture, how data capture should be configured, the types of data collected, data sample resolution, data sample rate, periods of inactivity for certain activities that may not require data collection (e.g., movement tracking may not be required when a user is sitting at an event), etc.

Figure 5:
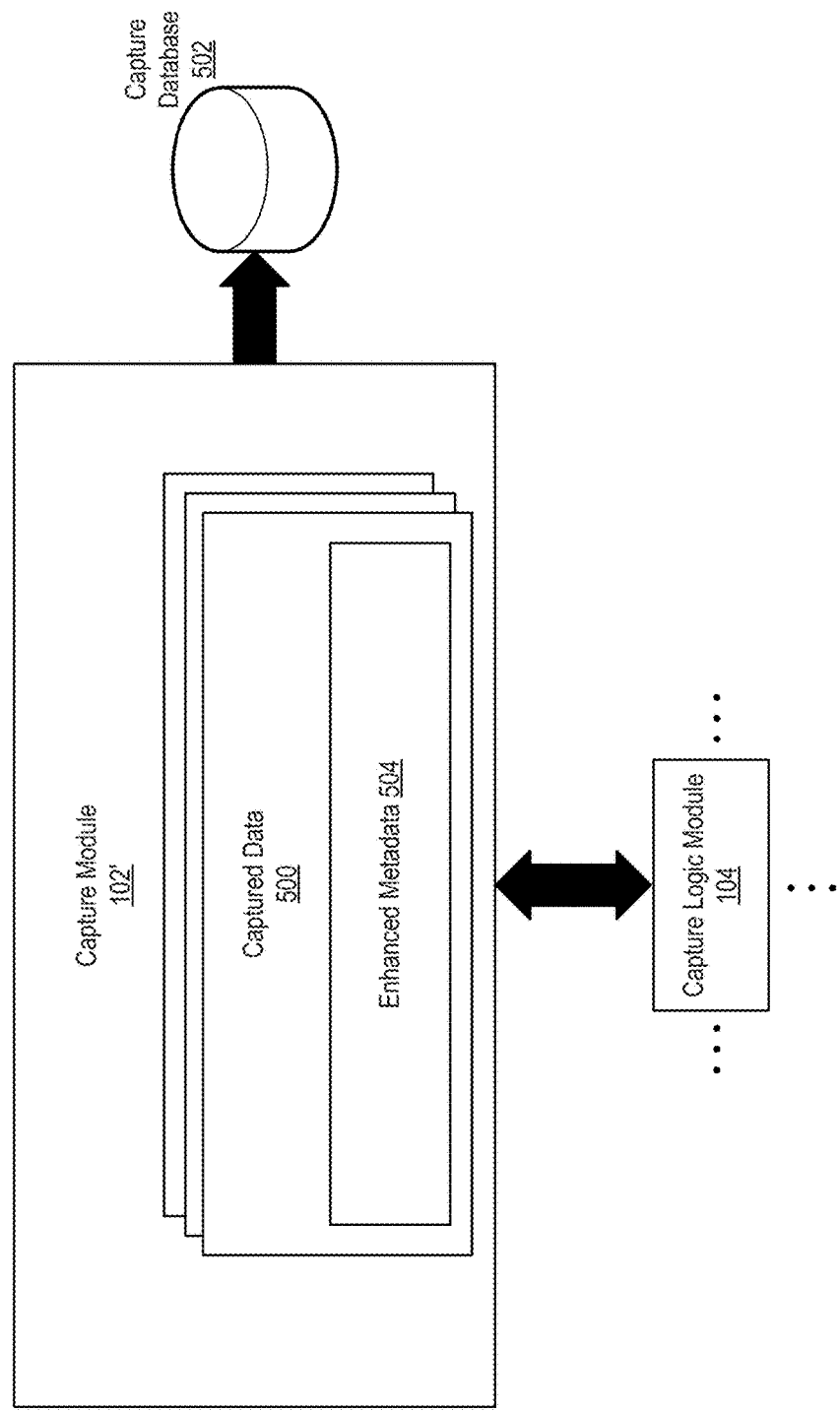
FIG. 5 illustrates an example of data capture in accordance with at least one embodiment of the present disclosure.

FIG. 5 illustrates an example of data capture in accordance with at least one embodiment of the present disclosure. In particular, FIG. 5 depicts an example of what may occur after it has been determined by capture logic module 104 that data should be captured. Capture module 102' may be configured to generate captured data 500 based on, for example, a configuration provided by capture logic module 104. The configuration may include, for example, duration of capture, rate of capture, quality level of capture (e.g., resolution, color level, bit sample rate, etc.), etc. In an example scenario wherein capture module 102' comprises at least image capture equipment (e.g., a camera) to capture images and/or video, an example configuration of capture module 102' may include an image capture multiple and/or interval that may indicate a number of images to capture at a certain rate (e.g., which may be dynamic), a sleep/wakeup interval and other camera-specific settings such as zoom, image resolution, ISO, aperture, shutter speed, flash behavior, etc. The configuration of capture module 102' may not only be based on the biometric data, context data and/or content data, but may also include device-centric data such as device capabilities, processor loading, available resources (e.g., storage space, power level, etc.), etc.

Following capture, captured data 500 may be stored in a capture database 502. Capture database 502 may reside within device 200. Alternatively, at least part of capture database 502 may be situated outside of device 200 (e.g., in remote resource 228) wherein capture module 102 may cause captured data 500 to be transmitted to capture database 502 in real time, periodically, etc. An embodiment wherein at least part of capture database 502 is external to device 200 may be beneficial in that it may allow for additional storage space, redundant storage in case device 200 is lost or damaged, etc. In one embodiment, the data may be stored along with enhanced metadata 504. Enhanced metadata 504 may be based on at least one of the biometric data, the content data or the context data. The inclusion of enhanced metadata 504 may not only aid in post-capture processing (e.g., in grouping or otherwise sorting captured data 500), but may also be provided to feedback database 306 for refining the manner in which capture scenarios are identified and/or data capture is triggered. In one embodiment, feedback database 306 and capture database 502 may actually be the same database, or may at least share some common data storage regions, to avoid duplication and conserve space within the memory of device 200.

Figure 6:
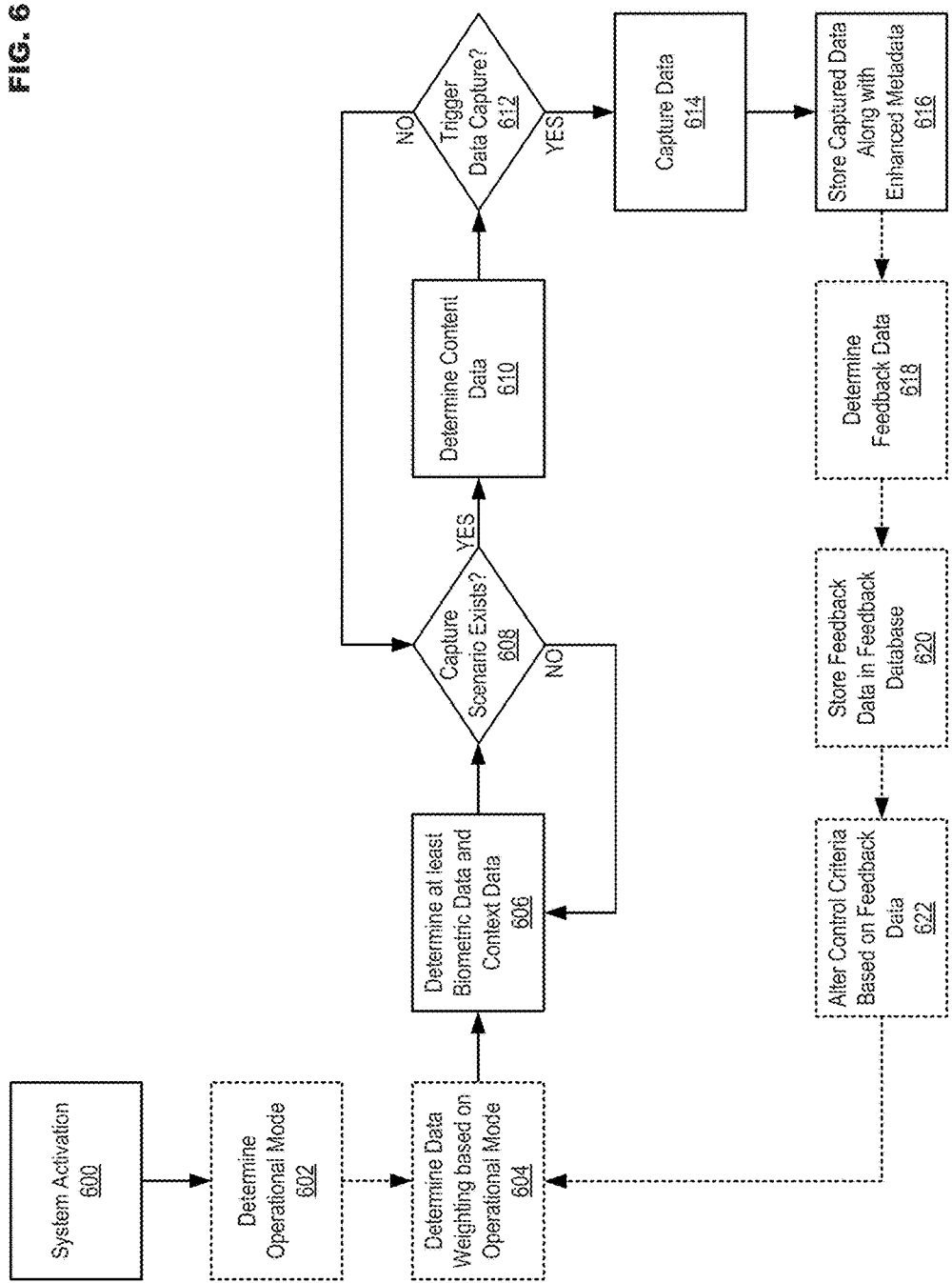
FIG. 6 illustrates example operations for dynamic control for data capture in accordance with at least one embodiment of the present disclosure.

FIG. 6 illustrates example operations for dynamic control for data capture in accordance with at least one embodiment of the present disclosure. In operation 600 the system may be activated. Operations 602 to 604 may be optional in that their presence may depend on whether the system comprises multiple mode functionality. In operation 602, an operational mode may be determined. The operational mode determined in operation 602 may then be employed to determine a data weighting in operation 604. In operation 606 at least biometric data and context data may be determined. A determination may then be made in operation 608 as to whether a capture scenario exists based on at least one of the biometric data and the context data obtained in operation 606. A determination that a capture scenario does not exist may be followed by a return to operation 606 wherein additional biometric data and/or context data may be determined.

If it is determined in operation 608 that a capture scenario exists, then content data may be determined in operation 610. A determination may then be made in operation 612 as to whether to trigger data capture. A determination not to trigger data capture in operation 612 may be followed by a return to operation 608 to reanalyze the capture scenario. If in operation 612 it is determined that data capture should be triggered, then in operation 614 data may be captured and in operation 616 the captured data may be stored along with enhanced metadata (e.g., in a capture database). Operations 618 to 620 may be optional in that they are not required to occur immediately following operation 616. In operation 618, feedback data may be determined based on, for example, user-generated feedback information, enhanced metadata, etc. The resulting feedback data may be stored in a feedback database in operation 620. The control criteria used to determine a capture scenario and/or when to trigger data capture may then be modified and fed back to refine the system. For example, the control criteria may alter how weighting is set for different modes, how biometric data, context data and/or content data is analyzed, how a capture scenario is determined, how data capture is triggered, etc.

While FIG. 6 illustrates operations according to one embodiment, it is to be understood that not all of the operations depicted in FIG. 6 are necessary for other embodiments. Indeed, it is fully contemplated herein that in other embodiments of the present disclosure, the operations depicted in FIG. 6, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, this application is directed to dynamic control for data capture. A device may comprise a capture logic module to receive at least one of biometric data from a biometric sensing module, context data from a context sensing module or content data from a content sensing module. The capture logic module may determine if a capture scenario exists based on at least one of the biometric data and context data. The determination may be weighted based on an operational mode. If a capture scenario is determined to exist, the capture logic module may then determine whether to capture data based on at least the content data. Captured data may be stored in a capture database in the device (e.g., along with enhanced metadata based on at least one of the biometric data, the context data or the content data). The device may also comprise a feedback database including feedback data.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for dynamic control for data capture, as provided below.

According to example 1 there is provided a device to control data capture. The device may comprise a capture database to store captured data and a capture logic module to receive biometric data from a biometric sensing module, receive context data from a context sensing module, determine whether a capture scenario exists based on at least one of the biometric data or context data, receive content data from a content sensing module based on at least the determination of whether a capture scenario exists, determine whether to capture data based on at least the content data, cause a capture module to capture data based on at least the determination of whether to capture data and cause the captured data to be stored in the capture database.

Example 2 may include the elements of example 1, and may further comprise a communication module to allow the capture logic module to interact with at least part of the biometric sensing module external to the device.

Example 3 may include the elements of example 2, wherein the communication module is further to allow the capture logic module to interact with at least part of the context sensing module external to the device.

Example 4 may include the elements of example 2, wherein the communication module is further to allow the capture logic module to interact with at least part of the capture module external to the device.

Example 5 may include the elements of any of examples 1 to 4, wherein the biometric data comprises data describing at least one of movement of a user of the device, focus of the user of the device or excitement level of the user of the device as determined based on data received by the biometric sensing module.

Example 6 may include the elements of any of examples 1 to 4, wherein the context data comprises data describing at least one of time, date, location, scene, proximate objects or proximate people as determined based on data received by the context sensing module.

Example 7 may include the elements of any of examples 1 to 4, wherein the content data comprises data describing at least one of capture quality, aesthetic quality or object recognition as determined based on data received by the content sensing module.

Example 8 may include the elements of any of examples 1 to 4, further comprising a feedback database situated at least partially in the device to provide feedback data to generate criteria for use in controlling at least one of the biometric sensing module, context sensing module, content sensing module or capture module.

Example 9 may include the elements of example 8, wherein the feedback data comprises at least one of user-generated feedback or enhanced metadata associated with the captured data.

Example 10 may include the elements of example 9, wherein the user-generated feedback comprises at least one of user interaction with captured data or online interaction of others regarding the captured data.

Example 11 may include the elements of any of examples 1 to 4, wherein the capture logic module is further to configure the capture module prior to causing the capture module to capture data.

Example 12 may include the elements of example 11, wherein configuring the capture module comprises configuring at least one of a capture multiple, capture rate or capture quality.

Example 13 may include the elements of any of examples 1 to 4, wherein the capture logic module is further to cause enhanced metadata to be stored in the capture database in association with the capture data, the enhanced metadata being based on at least one of the biometric data, the context data or content data.

Example 14 may include the elements of any of examples 1 to 4, wherein the capture logic module is further to determine a mode of operation and set weighting between at least the biometric data and context data based on the mode of operation prior to determining whether a capture scenario exists based on at least one of the biometric data or context data.

Example 15 may include the elements of example 1, and may further comprise a communication module to allow the capture logic module to interact with at least one of part of the biometric sensing module external to the device, part of the context sensing module external to the device or part of the capture module external to the device.

Example 16 may include the elements of any of examples 1 to 4, wherein the biometric data comprises data describing at least one of movement of a user of the device, focus of the user of the device or excitement level of the user of the device as determined based on data received by the biometric sensing module, the context data comprises data describing at least one of time, date, location, scene, proximate objects or proximate people as determined based on data received by the context sensing module and the content data comprises data describing at least one of capture quality, aesthetic quality or object recognition as determined based on data received by the content sensing module.

According to example 17 there is provided a method for dynamic control of data capture. The method may comprise receiving biometric data, receiving context data, determining whether a capture scenario exists based on at least one of the biometric data or context data, receiving content data based on at least the determination of whether a capture scenario exists, determining whether to capture data based on at least the content data, causing data to be captured based on at least the determination of whether to capture data and causing the captured data to be stored in a capture database.

Example 18 may include the elements of example 17, wherein the biometric data comprises data describing at least one of movement of a user, focus of the user or excitement level of the user.

Example 19 may include the elements of example 17, wherein the context data comprises data describing at least one of time, date, location, scene, proximate objects or proximate people.

Example 20 may include the elements of example 17, wherein the content data comprises data describing at least one of capture quality, aesthetic quality or object recognition.

Example 21 may include the elements of example 17, and may further comprise controlling at least one of biometric sensing, context sensing, content sensing or data capture based on feedback data.

Example 22 may include the elements of example 21, wherein the feedback data comprises at least one of user-generated feedback or enhanced metadata associated with the captured data.

Example 23 may include the elements of example 22, wherein the user-generated feedback comprises at least one of user interaction with captured data or online interaction of others regarding the captured data.

Example 24 may include the elements of any of examples 17 to 23, and may further comprise configuring data capture prior to causing data to be captured.

Example 25 may include the elements of example 24, wherein configuring data capture comprises configuring at least one of a capture multiple, capture rate or capture quality.

Example 26 may include the elements of any of examples 17 to 23, and may further comprise causing enhanced metadata to be stored in the capture database in association with the capture data, the enhanced metadata being based on at least one of the biometric data, the context data or content data.

Example 27 may include the elements of any of examples 17 to 23, and may further comprise determining a mode of operation and setting weighting between at least the biometric data and context data based on the mode of operation prior to determining whether a capture scenario exists based on at least one of the biometric data or context data.

Example 28 may include the elements of any of examples 17 to 23, wherein the biometric data comprises data describing at least one of movement of a user, focus of the user or excitement level of the user, the context data comprises data describing at least one of time, date, location, scene, proximate objects or proximate people and the content data comprises data describing at least one of capture quality, aesthetic quality or object recognition.

According to example 29 there is provided a system including at least a device, the system being arranged to perform the method of any of the above examples 17 to 28.

According to example 30 there is provided chipset arranged to perform the method of any of the above examples 17 to 28.

According to example 31 there is provided at least one machine readable medium comprising a plurality of instructions that, in response to be being executed on a computing device, cause the computing device to carry out the method according to any of the above examples 17 to 28.

According to example 32 there is provided a device configured for dynamic control of data capture, the device being arranged to perform the method of any of the above examples 17 to 28.

According to example 33 there is provided a system for dynamic control of data capture. The system may comprise means for receiving biometric data, means for receiving context data, means for determining whether a capture scenario exists based on at least one of the biometric data or context data, means for receiving content data based on at least the determination of whether a capture scenario exists, means for determining whether to capture data based on at least the content data, means for causing data to be captured based on at least the determination of whether to capture data and means for causing the captured data to be stored in a capture database.

Example 34 may include the elements of example 33, wherein the biometric data comprises data describing at least one of movement of a user, focus of the user or excitement level of the user.

Example 35 may include the elements of example 33, wherein the context data comprises data describing at least one of time, date, location, scene, proximate objects or proximate people.

Example 36 may include the elements of example 33, wherein the content data comprises data describing at least one of capture quality, aesthetic quality or object recognition.

Example 37 may include the elements of any of examples 33 to 36, and may further comprise means for controlling at least one of biometric sensing, context sensing, content sensing or data capture based on feedback data.

Example 38 may include the elements of any of examples 33 to 36, and may further comprise means for causing enhanced metadata to be stored in the capture database in association with the capture data, the enhanced metadata being based on at least one of the biometric data, the context data or content data.

Example 39 may include the elements of any of examples 33 to 36, and may further comprise means for determining a mode of operation and means for setting weighting between at least the biometric data and context data based on the mode of operation prior to determining whether a capture scenario exists based on at least one of the biometric data or context data.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device to control data capture, comprising:
    memory circuitry including a capture database to store captured data, a feedback database to store feedback data and at least one model to generate criteria for capture scenario determination trained by at least one of machine learning or data mining tools; and
    capture logic circuitry to:
        receive biometric data sensed from a user of the device from biometric sensing circuitry;
        receive context data corresponding to a current context of the user of the device from context sensing circuitry;
        determine a mode of operation and set weighting between at least the biometric data and the context data based on the mode of operation;
        determine whether a capture scenario exists based on at least one of the weighted biometric data or the weighted context data;
        receive content data from content sensing circuitry based on at least the determination of whether a capture scenario exists;
        determine whether to capture data based on at least the content data and a device condition including at least device processing load, device communication traffic, device battery level and device data storage space;
        cause capture circuitry to capture data based on at least the determination of whether to capture data;
        cause the captured data to be stored in the capture database;
        determine at least one response to the captured data;
        determine the feedback data based on the at least one response;
        store the feedback data in the feedback database; and
        provide the feedback data from the feedback database to train the at least one model to generate the criteria for capture scenario determination.

2. The device of claim 1, further comprising communication circuitry to allow the capture logic circuitry to interact with at least part of the biometric sensing circuitry external to the device.

3. The device of claim 2, wherein the communication circuitry is further to allow the capture logic circuitry to interact with at least part of the context sensing circuitry external to the device.

4. The device of claim 2, wherein the communication circuitry is further to allow the capture logic circuitry to interact with at least part of the capture circuitry external to the device.

5. The device of claim 1, wherein the biometric data comprises data describing at least one of movement of a user of the device, focus of the user of the device or excitement level of the user of the device as determined based on data received by the biometric sensing circuitry.

6. The device of claim 1, wherein the context data comprises data describing at least one of time, date, location, scene, proximate objects or proximate people as determined based on data received by the context sensing circuitry.

7. The device of claim 1, wherein the content data comprises data describing at least one of capture quality, aesthetic quality or object recognition as determined based on data received by the content sensing circuitry.

8. The device of claim 1, wherein the feedback database is situated at least partially in the device and the criteria is for use in controlling at least one of the biometric sensing circuitry, context sensing circuitry, content sensing circuitry or capture circuitry.

9. The device of claim 1, wherein the capture logic circuitry is further to:
    configure the capture circuitry prior to causing the capture circuitry to capture data.

10. The device of claim 1, wherein the capture logic circuitry is further to:
    cause enhanced metadata to be stored in the capture database in association with the capture data, the enhanced metadata being based on at least one of the biometric data, the context data or content data.

11. The device of claim 1, wherein the at least one response is based on determining at least one of an intentional or subjective response of the user to previously captured data.

12. A method for dynamic control of data capture, comprising:
    receiving biometric data;
    receiving context data;
    determining a mode of operation and setting weighting between at least the biometric data and the context data based on the mode of operation;
    determining whether a capture scenario exists based on at least one of the weighted biometric data or the weighted context data;
    receiving content data based on at least the determination of whether a capture scenario exists;
    determining whether to capture data based on at least the content data and a device condition of a device to perform the data capture including at least device processing load, device communication traffic, device battery level and device data storage space;
    causing data to be captured based on at least the determination of whether to capture data;

causing the captured data to be stored in a capture database;

determining at least one response to the captured data;

determining feedback data based on the at least one response;

storing the feedback data in a feedback database; and providing the feedback data from the feedback database to train at least one model to generate criteria for capture scenario determination.

13. The method of claim 12, wherein the biometric data comprises data describing at least one of movement of a user, focus of the user or excitement level of the user.

14. The method of claim 12, wherein the context data comprises data describing at least one of time, date, location, scene, proximate objects or proximate people.

15. The method of claim 12, wherein the content data comprises data describing at least one of capture quality, aesthetic quality or object recognition.

16. The method of claim 12, further comprising:

controlling at least one of biometric sensing, context sensing, content sensing or data capture based on the criteria.

17. The method of claim 12, further comprising:

causing enhanced metadata to be stored in the capture database in association with the capture data, the enhanced metadata being based on at least one of the biometric data, the context data or content data.

18. The method of claim 12, wherein the at least one response is based on determining at least one of an intentional or subjective response of the user to previously captured data.

19. A non-transitory machine-readable storage medium having stored thereon, individually or in combination, instructions for dynamic control of data capture that, when executed by one or more processors, cause the one or more processors to:

receive biometric data;

receive context data;

determine a mode of operation and set weighting between at least the biometric data and the context data based on the mode of operation;

determine whether a capture scenario exists based on at least one of the weighted biometric data or the weighted context data;

receive content data based on at least the determination of whether a capture scenario exists;

determine whether to capture data based on at least the content data and a device condition of a device to perform the data capture including at least device processing load, device communication traffic, device battery level and device data storage space;

cause data to be captured based on at least the determination of whether to capture data;

cause the captured data to be stored in a capture database;

determine at least one response to the captured data;

determine feedback data based on the at least one response;

store the feedback data in a feedback database; and provide the feedback data from the feedback database to train at least one model to generate criteria for capture scenario determination.

20. The medium of claim 19, wherein the biometric data comprises data describing at least one of movement of a user, focus of the user or excitement level of the user.

21. The medium of claim 19, wherein the context data comprises data describing at least one of time, date, location, scene, proximate objects or proximate people.

22. The medium of claim 19, wherein the content data comprises data describing at least one of capture quality, aesthetic quality or object recognition.

23. The medium of claim 19, further comprising instructions that, when executed by the one or more processors, cause the one or more processors to:

control at least one of biometric sensing, context sensing, content sensing or data capture based on the criteria.

24. The medium of claim 19, further comprising instructions that, when executed by the one or more processors, cause the one or more processors to:

cause enhanced metadata to be stored in the capture database in association with the capture data, the enhanced metadata being based on at least one of the biometric data, the context data or content data.

25. The medium of claim 19, wherein the at least one response is based on determining at least one of an intentional or subjective response of the user to previously captured data.

* * * * *